July 21, 1959     R. H. HESS     2,895,253
FISHING TACKLE
Filed July 3, 1958

INVENTOR:
Ray H. Hess
BY
Edward L. Amonette
AGENT

United States Patent Office 2,895,253
Patented July 21, 1959

2,895,253

FISHING TACKLE

Ray H. Hess, Albuquerque, N. Mex.

Application July 3, 1958, Serial No. 746,404

10 Claims. (Cl. 43—42.15)

This invention relates in general to fishing tackle and more particularly to fishing lures of the spinning type and to a fish line anti-twisting device for use with such lures.

Most fishing lures of the spinning type, or spinners, as they are called, have individual actions or colors, making necessary the purchase of a large variety of spinners so that the fisherman may have a variety of actions and colors at his disposal while fishing. It is a general object of my invention to provide a spinner whose color and action are changeable by the mere changing of position of one or more spinner elements in the lure, thus making it unnecessary for the fisherman to purchase more than one spinner to secure a variety of effects which are attractive to fish.

Coincident with the recent rise in popularity of the type of fishing known as spinning, there has arisen the problem of preventing twisting of the monofilament line used in that type of fishing. Since my new type of spinner spins very rapidly during use, and since I have been unable to find a fish line anti-twisting device which will prevent twist of a monofilament line when my lure is used, I have invented also a novel fish line anti-twisting device. It is another general object of my invention to provide a fish line anti-twisting device which will prevent twist of a fish line when my novel spinner, or others, is used. When used in combination, my new spinner and my fish line anti-twisting device provide a very effective piece of fishing tackle which is unusually attractive to the fish and which operates with a minimum of trouble to the fisherman.

Briefly, the spinner element of my lure is made of thin sheet material and includes four attachment points, pairs of opposites of which may be used alternatively. Although the shape of the body portion of the spinner element may vay, the attachment points are always located so as to form the corners of an equilateral figure. Along a line parallel to a line of adjacent attachment points is located a vane which stands approximately at right angles to a surface of the main body portion of the lure for maximum efficiency. Progressing around the periphery of the main body portion of the lure, the vanes alternately extend from opposite surfaces of the portion. Each of the four vanes acts in imparting a spinning motion to the lure when it is pulled through the water by a line connected directly or indirectly to one of the attachment points.

A particular feature of my invention is that, by moving the attached elements to the next points of attachment either clockwise or counterclockwise from those previously used, the direction of spin of the spinner element is reversed. Also, if the arrangement of attachment points is such as to form an equilateral figure other than a square, the speed of rotation will be changed by such a change in attachment points.

Another feature of my invention concerns the change in appearance of a spinner element by a rotative change of attachment points described above. Thus if the front half of the lure is painted one color, for instance, red, and the rear half is painted white, the spinner will resemble a red-headed, white-tailed fish as it moves through the water. If the alternative points of attachment are used, however, the two colors will blend in rotation, producing a single-colored lure. Also, by reversing the first connections, a white-headed, red-tailed lure results.

When the shape of the spinner element is such that a change in rotative speed results from a change in attachment points, it will be found that the spheroidal shape which the rotating spinner resembles in the water will change.

Briefly, the anti-twisting device which is a part of my fishing tackle utilizes a fin structure whose points of attachment are located in the lower front and rear corners of the fin to provide maximum stability. I have found that in the prior art many inventors tended to locate the points of attachment closer to the center line of the fin, thereby defeating the purpose of the fin. I have found that by adding a weight to the lower rear portion of the fin, just forward of the rearward attachment point, the stability is greatly increased so that a smaller fin may be used. This makes the device easier to cast with the use of light weight spinning rigs. I find that my anti-twist device works well in preventing line twist during casting through the air as well as during trolling or retrieval of the lure through the water.

A better understanding of my invention and its further objects and advantages may be had by reading the more detailed description to follow, in conjunction with the drawing, in which.

Figure 1:
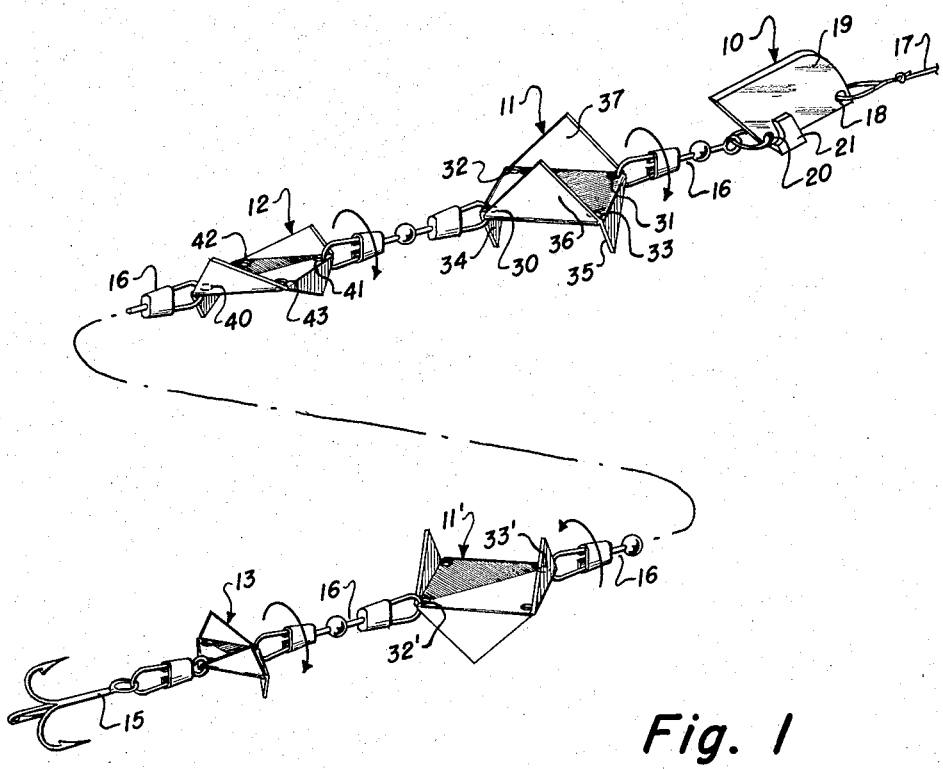
Fig. 1 is a perspective view of a preferred embodiment of my invention, showing several of the novel spinner elements connected in series behind the anti-twisting device, forming with the attached hook a complete unit of fishing tackle.

Referring now to Fig. 1, anti-twisting device 10 is shown connected in the lead position, followed by spinner elements 11, 12, 11', 13, and hook 15, in that order. A number of bead-chain connectors 16 serve to join each element of fishing tackle to the adjacent element, so that they may rotate freely with respect to one another. In use, fishing line 17 draws the tackle through the water from left to right in the figure.

Anti-twisting device 10, while superficially resembling similar elements of the prior art, has several constructional features which are critical. I have found through long experimentation that the device to work successfully in preventing the twisting of monofilament line 17, attachment point 18 must be located within the lower front quarter of fin 19, while attachment point 20 must be located within the lower rear quarter of the fin. The object is to have an anti-twisting device which has as much as possible of the fin above a line joining the two points of attachment. This leads to the greatest stability possible. Weight 21 is attached between the formerly described two points of attachment, and it is necessary that the center of gravity of the weight be located below the line of the two points of attachment. Thus the weight acts as a keel in helping to maintain fin 19 in a vertical position against the twisting forces of the lure. I have secured the best results by locating the two attachment points in the lower corners of fin 19 and by mounting the weight as close as possible to attachment point 20.

Figure 2:
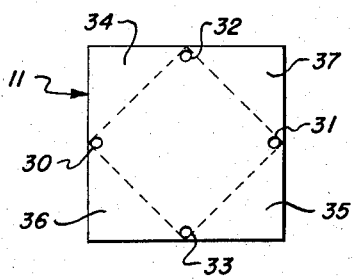
Fig. 2 shows a square piece of sheet material ready for manufacture into a spinner element.

Spinner elements 11 and 11' are each made from a square piece of sheet material, such as copper, as shown in Fig. 2. Attachment points 30, 31, 32, and 33 are located near the edges of the square and at their midpoints. These points of attachment may be simply holes drilled in the material as shown, or may be in the form of attached loops of wire or any of various other attachment means. Corners 34 and 35 are bent away from the surface shown in Fig. 2 (into the paper) along the broken lines until the corners are at approximately right angles to the under surface of the sheet material. Corners 36 and 37 are then bent in the opposite direction until they likewise are at right angles, this time to the opposite surface of the material.

Although I have shown the corners as being bent at right angles to the inner portion of the spinner element bounded by the four attachment points, it should be realized that the corners, which are now vanes, will impart spinning action to the element if they are bent at any angle. However, a right angle provides the greatest amount of spinner action for a given surface of vane, and therefore is most generally preferred. Likewise, although I have shown the corners as being left in their untrimmed shape, it is recognized that they could be rounded off or cut into almost any form, the result being a reduction in the vane area and hence a reduction in the spinning action obtained therefrom.

As shown mounted in Fig. 1, viewed from the anti-twisting device, spinner element 11 will rotate in a counter-clockwise direction. Spinner element 11' (which is identical to element 11) is attached to the adjacent spinner elements by attachment points 32' and 33', as compared with attachment points 30 and 31 used by element 11. This change to the alternate pair of attachment points in going from element 11 to element 11' results in a reversal in the direction of rotation of the elements, element 11' rotating in a clockwise direction. Thus it is seen that it is possible for the fisherman to change the direction of rotation of any element by merely detaching the element, and reattaching it by the alternate pair of attachment points. If the elements are painted contrasting colors as indicated in Fig. 1, element 11 will resemble a bait having a dark-colored head and a light-colored tail, while element 11' will show a color which is a blend of the two colors. If element 11 is reversed in its hookup so that attachment point 30 leads and attachment point 31 lags, a light head and dark tail will result.

Figure 3:
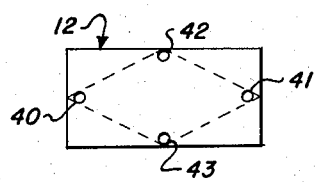
Fig. 3 shows a rectangular piece of sheet material ready for manufacture into a spinner element.

Spinner elements 12 and 13 are manufactured from rectangular pieces of material, as shown in Fig. 3. Attachment points 40 and 41 are located at the midpoints of the shorter sides of element 12, while attachment points 42 and 43 are similarly located on the longer sides. When element 12 is connected as shown in Fig. 1, using attachment points 40 and 41, it spins in a counterclockwise direction and at a slow rate of spin. The spheroidal shape made while it is spinning is long and narrow, since it is spinning about its long axis. If alternate attachment points 42 and 43 are used, the element will spin about its short axis at a much higher rate of spin, and in the opposite direction. A short, "fat" spheroidal shape will result.

Spinner element 13 is rectangular also, but has its corners bent in opposite directions compared to the corners of element 12. Therefore, although element 13 is shown connected to spin about its short axis, it spins counter-clockwise, as does element 12 when connected to spin about its long axis.

I have described a piece of fishing tackle which is capable of more efficient performance than tackle of the prior art, by reason of an improved anti-twisting device, and which is capable of assuming an almost unlimited number of shapes and appearances, by reason of the versatility of the individual spinner elements. By use of a variety of sizes and shapes of elements a fisherman may hook them up to provide almost any effect desired. Although I have shown a particular arrangement of elements, it is obvious that the possibilities of combination are great and I do not intend that my invention be limited to the arrangement, but as claimed below. Ease of manufacture is another virtue of my invention, making it cheap and available to all fishermen. Although I have described the spinner elements as being manufactured from bendable sheet material, I do not intend to be limited thereto. I have made successful spinner elements from various plastics, and I recognize that the elements could be molded in plastic as well as made from plastic parts cemented together. Also, if made from sheet metal, the vanes could be welded or otherwise attached to the remainder of the element. I have made many field tests of the invention and have found that I am able to catch fish with it when the fish will not strike at any other lure or bait.

I claim as my invention:

1. A spinner element for a fishing lure comprising: a piece of thin sheet material having four attachment points located near the edges and arranged to form the corners of an equilateral figure; and four vanes, each extending from a surface of said piece parallel to the line of adjacent attachment points, alternate vanes extending from opposite surfaces of said piece.

2. A spinner element for a fishing lure comprising: a piece of thin sheet material having four attachment points located near the edges and arranged to form the corners of an equilateral figure; and four vanes, each extending approximately perpendicular to a surface of said piece parallel to the line of adjacent attachment points, alternate vanes extending from opposite surfaces of said piece.

3. A spinner element as in claim 2, wherein the equilateral figure is a square.

4. A spinner element as in claim 2, wherein the equilateral figure is a rhombus.

5. A spinner element for a fishing lure comprising: a rectangular piece of bendable thin sheet material having a first and a second pair of diagonally opposite corners and having an attachment point located at the midpoint of each side of the rectangle near its edge, the first pair of corners being bent to extend in the same direction at approximately right angles to one surface of the inner portion of the rectangle approximately bounded by lines joining adjacent points of attachment, and the second pair of corners having the same relationship to the other surface, whereby attachment of other fishing gear to opposite attachment points will allow rotation of the spinner element about an axis including said opposite attachment points.

6. A spinner element as in claim 5, wherein said rectangular piece of material is a square.

7. A spinner element as in claim 5, wherein at least one surface of the element is divided into two contrasting colored portions divided by a line joining a pair of opposite attachment points.

8. A fish line anti-twisting device for use with baits or lures comprising: a vertical fin having a first point of attachment for the lure in its lower rear quarter and a second point of attachment for the first line in its lower forward quarter; and a weight attached to the fin forward of said first point of attachment and rearward of said second point of attachment and having its center of gravity below a line connecting said points of attachment.

9. A fish line anti-twisting device as in claim 8, wherein said vertical fin has the general shape of a parallelogram, said first and second points of attachment being located at the lower rear and front corners respectively of said fin, and said weight being attached to the fin closely forward of the first point of attachment.

10. Fishing tackle comprising: a vertical fin having a first point of attachment for a fish line in its lower forward quarter and a second point of attachment in is lower rear quarter; a weight attached to the fin forward of said second point of attachment and rearward of said first point of attachment and having its center of gravity below a line connecting said two points of attachment; a piece of thin sheet material having four attachment points located near the edges and arranged to form the corners of an equilateral figure one of said four attachment points being attached rotatably to the second point of attachment of said fin; four vanes, each extending approximately perpendicular to a surface of said piece parallel to the line of adjacent attachment points, alternate vanes extending from opposite surfaces of said piece; a hook attached to the point of attachment of said four attachment points which is opposite the one attached to said fin.

References Cited in the file of this patent

UNITED STATES PATENTS

| | | |
|---|---|---|
| 744,942 | Stewart | Nov. 24, 1903 |
| 1,796,590 | Carlson | Mar. 17, 1931 |
| 1,837,656 | Crosby | Dec. 22, 1931 |
| 2,849,826 | Kjormoe | Sept. 2, 1958 |